(12) United States Patent
Pan et al.

(10) Patent No.: US 11,294,073 B2
(45) Date of Patent: Apr. 5, 2022

(54) TIGHTLY COMBINED GPS/BDS CARRIER DIFFERENTIAL POSITIONING METHOD

(71) Applicant: SOUTHEAST UNIVERSITY, Jiangsu (CN)

(72) Inventors: Shuguo Pan, Jiangsu (CN); Wang Gao, Jiangsu (CN); Yanheng Wang, Jiangsu (CN); Chengfa Gao, Jiangsu (CN); Qing Wang, Jiangsu (CN); Ruicheng Zhang, Jiangsu (CN); Jian Zhang, Jiangsu (CN); Guoliang Liu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 222 days.

(21) Appl. No.: 16/626,570

(22) PCT Filed: May 4, 2018

(86) PCT No.: PCT/CN2018/085572
§ 371 (c)(1),
(2) Date: Dec. 26, 2019

(87) PCT Pub. No.: WO2019/174113
PCT Pub. Date: Sep. 19, 2019

(65) Prior Publication Data
US 2020/0116872 A1   Apr. 16, 2020

(30) Foreign Application Priority Data
Mar. 16, 2018 (CN) .......................... 201810217695.7

(51) Int. Cl.
*G01S 19/44* (2010.01)
*G01S 19/07* (2010.01)
(Continued)

(52) U.S. Cl.
CPC .............. *G01S 19/44* (2013.01); *G01S 19/04* (2013.01); *G01S 19/071* (2019.08); *G01S 19/25* (2013.01); *G01S 19/32* (2013.01); *G01S 19/41* (2013.01)

(58) Field of Classification Search
CPC .......... G01S 19/44; G01S 19/71; G01S 19/25; G01S 19/32; G01S 19/41
(Continued)

(56) References Cited

U.S. PATENT DOCUMENTS

| 2003/0201934 A1* | 10/2003 | Asher | G01S 19/26 342/357.23 |
| 2008/0036643 A1* | 2/2008 | Kiukkonen | G01S 19/32 342/21 |

(Continued)

FOREIGN PATENT DOCUMENTS

| CN | 103728643 | 4/2014 |
| CN | 103941272 | 7/2014 |

(Continued)

OTHER PUBLICATIONS

Wang Gao, et al., "Combined GPS and BDS for single-frequency continuous RTK positioning through real-time estimation of differential inter-system biases", GPS Solutions, Nov. 21, 2017, pp. 1-13.
(Continued)

*Primary Examiner* — Bo Fan
(74) *Attorney, Agent, or Firm* — JCIPRNET (57) ABSTRACT

A tightly combined GPS/BDS carrier differential positioning method is provided. The method comprises: using a GPS as a reference system to construct a GPS intra-system double-difference ionosphere-free combination model and a GPS/BDS inter-system double-difference ionosphere-free combination model; selecting a BDS reference satellite to re-parameterize an ambiguity of a GPS/BDS inter-system
(Continued)

double-difference ionosphere-free combination and perform parameter decorrelation, estimating an ionosphere-free combination carrier differential inter-system bias in real time, and performing reference conversion on the ionosphere-free carrier inter-system bias to realize a continuous estimability of the ionosphere-free carrier differential inter-system bias in necessary; and finally, using ambiguity-fixed base carrier observations to form the ionosphere-free combination and performing tightly combined positioning on the inter-system double-difference ionosphere-free combination based on the estimated ionosphere-free carrier difference inter-system bias.

7 Claims, 3 Drawing Sheets

(51) Int. Cl.
*G01S 19/04* (2010.01)
*G01S 19/25* (2010.01)
*G01S 19/32* (2010.01)
*G01S 19/41* (2010.01)

(58) Field of Classification Search
USPC ........... 342/357.27, 350, 34, 357.76, 357.65, 342/357.77, 357.59, 352, 357.23
See application file for complete search history.

(56) References Cited

U.S. PATENT DOCUMENTS

| | | | | |
|---|---|---|---|---|
| 2010/0073226 | A1* | 3/2010 | Henkel | G01S 19/44 342/357.27 |
| 2016/0077214 | A1* | 3/2016 | Xianglin | G01S 19/073 342/357.27 |
| 2017/0269231 | A1* | 9/2017 | Dai | G01S 19/32 |

FOREIGN PATENT DOCUMENTS

| | | |
|---|---|---|
| CN | 104459745 | 3/2015 |
| CN | 105223598 | 1/2016 |

OTHER PUBLICATIONS

"International Search Report (Form PCT/ISA/210) of PCT/CN2018/085572," dated Aug. 30, 2018, with English translation thereof, pp. 1-4.

* cited by examiner

TIGHTLY COMBINED GPS/BDS CARRIER DIFFERENTIAL POSITIONING METHOD

CROSS-REFERENCE TO RELATED APPLICATION

This application is a 371 of international application of PCT application serial no. PCT/CN2018/085572, filed on May 4, 2018, which claims the priority benefit of China application no. 201810217695.7, filed on Mar. 16, 2018. The entirety of each of the above mentioned patent applications is hereby incorporated by reference herein and made a part of this specification.

BACKGROUND

Technical Field

The present invention relates to a multi-system combined navigation positioning technology, and more particularly, to a GPS/BDS tight combined carrier differential positioning method, which belongs to the field of GNSS (Global Navigation Satellite System) positioning and navigation technologies.

Description of Related Art

In relative positioning, two models are usually used when observations are combined by different satellite systems: one is that each system selects a loosely combined model of a reference satellite thereof, i.e., an intra-system difference model; and the other is that different systems select a tight combined model of a common reference satellite, i.e., an inter-system difference model. For a CDMA (Code Division Multiple Access) system, a satellite can eliminate carrier and pseudorange hardware delays at a receiver when performing intra-system difference. However, when performing inter-system difference, it is usually difficult to eliminate the hardware delay due to different signal modulation modes used by each system, and it is necessary to extract a difference inter-system bias as prior information for tight combined positioning.

Researches on tightly combined positioning mainly focus on the same frequencies of different systems at current, and are mainly applied to a single-frequency positioning model. In the process of combining multi-GNSS observations, different frequencies will be encountered more often, for example, GPS/BDS-2 dual systems do not have a shared frequency. Therefore, a differential positioning algorithm which only studies the same frequency between systems is not conducive to give full play to the advantages of multi-GNSS combined positioning.

The present research results show that the carrier difference inter-system bias between different systems with different frequencies presents time domain stability, which provides a technical basis for carrier difference tight combined positioning.

SUMMARY

In order to make up for the deficiency of the existing research and better exert the advantages of multi-GNSS tight combined positioning, the present invention provides a GPS/BDS tight combined carrier differential positioning method, which uses a GPS/BDS observation to construct an inter-system double-difference model, introduces a BDS reference satellite to perform parameter decorrelation, ensures a continuous estimability of a carrier difference inter-system bias through reference conversion, and finally, uses a fixed ambiguity to form an ionosphere-free combination and perform tight combined positioning based on the estimated carrier difference inter-system bias.

The following technical solutions are employed in the present invention to solve the technical problems above.

The present invention provides a GPS/BDS tight combined carrier differential positioning method, which comprises the following steps of:

step 1: selecting a GPS reference satellite to construct a GPS intra-system double-difference ionosphere-free combination model, a GPS/BDS inter-system double-difference ionosphere-free combination model and a GPS/BDS intra-system double-difference wide-lane ambiguity calculation model;

step 2: realizing decorrelation of an inter-system bias parameter with single-difference and double-difference ambiguities in ionosphere-free combinations;

step 3: performing reference conversion to realize a continuous estimability of an ionosphere-free combination difference inter-system bias;

step 4: separating a base carrier ambiguity by using an ionosphere-free combination and a fixed wide-lane ambiguity; and step 5: forming the ionosphere-free combination by using base carrier observations to perform high-precision positioning.

As a further technical solution of the present invention, the step 1 specifically comprises:

step 11: constructing an inter-station single-difference ionosphere-free combination model:

$$\Delta \phi_{IF,G}^s = \Delta \rho_G^s + \Delta dt + \lambda_{NL,G}(\Delta \delta_{IF,G} + \Delta N_{IF,G}^s) + \Delta T_G^s + \Delta \varepsilon_{IF,G}^s \quad (1)$$

$$\Delta P_{IF,G}^s = \Delta \rho_G^s + \Delta dt + \Delta d_{IF,G} + \Delta T_G^s + \Delta e_G^s \quad (2)$$

$$\Delta \phi_{IF,C}^q = \Delta \rho_C^q + \Delta dt + \lambda_{NL,C}(\Delta \delta_{IF,C} + \Delta N_{IF,C}^q) + \Delta T_C^q + \Delta \varepsilon_{IF,C}^q \quad (3)$$

$$\Delta P_{IF,C}^q = \Delta \rho_C^q + \Delta dt + \Delta d_{IF,C} + \Delta T_C^q + \Delta e_{IF,C}^q \quad (4)$$

$$\Delta \phi_{IF,G}^s = \frac{f_{1,G}^2 \Delta \phi_{1,G}^s}{f_{1,G}^2 - f_{2,G}^2} - \frac{f_{2,G}^2 \Delta \phi_{2,G}^s}{f_{1,G}^2 - f_{2,G}^2} \quad \Delta N_{IF,G}^s = \frac{f_{1,G}^2 \Delta N_{1,G}^s}{f_{1,G}^2 - f_{2,G}^2} - \frac{f_{2,G}^2 \Delta N_{2,G}^s}{f_{1,G}^2 - f_{2,G}^2} \quad (5)$$

$$\Delta \phi_{IF,C}^q = \frac{f_{1,C}^2 \Delta \phi_{1,C}^q}{f_{1,C}^2 - f_{2,C}^2} - \frac{f_{2,C}^2 \Delta \phi_{2,C}^q}{f_{1,C}^2 - f_{2,C}^2} \quad \Delta N_{IF,C}^q = \frac{f_{1,C}^2 \Delta N_{1,C}^q}{f_{1,C}^2 - f_{2,C}^2} - \frac{f_{2,C}^2 \Delta N_{2,C}^q}{f_{1,C}^2 - f_{2,C}^2} \quad (6)$$

$$\Delta P_{IF,G}^s = \frac{f_{1,G}^2 \Delta P_{1,G}^s}{f_{1,G}^2 - f_{2,G}^2} - \frac{f_{2,G}^2 \Delta P_{2,G}^s}{f_{1,G}^2 - f_{2,G}^2} \quad \Delta P_{IF,C}^q = \frac{f_{1,C}^2 \Delta P_{1,C}^q}{f_{1,C}^2 - f_{2,C}^2} - \frac{f_{2,C}^2 \Delta P_{2,C}^q}{f_{1,C}^2 - f_{2,C}^2} \quad (7)$$

wherein equations (1) and (2) respectively represent a carrier observation equation and a pseudorange observation equation of a GPS inter-station single-difference ionosphere-free combination, equations (3) and (4) respectively represent a subcarrier observation equation and a pseudorange observation equation of a BDS inter-station single-difference ionosphere-free combination, equation (5) represents a GPS inter-station single-difference ionosphere-free carrier observation and a GPS inter-station single-difference ionosphere-free ambiguity, equation (6) represents a BDS inter-station single-difference ionosphere-free carrier observation value and a BDS inter-station single-difference ionosphere-free ambiguity, and equation (7) represents a GPS inter-station single-difference pseudorange ionosphere-free combination and a BDS inter-station single-difference pseudorange ionosphere-free combination;

wherein, $s=1_G, 2_G, \ldots, m_G$, $m_G$ represents a number of GPS satellites, $\Delta\phi_{IF,G}^s$ represents a carrier observation of an inter-station single-difference ionosphere-free combination of GPS satellite s, $\Delta\rho_G^s$ represents a single-difference distance between a station and the GPS satellite, $\Delta\rho_G^s$ represents an inter-station single-difference receiver clock bias, $\lambda_{NL,G}$ represents a GPS narrow-lane wavelength, $\Delta\delta_{IF,G}$ represents a carrier hardware delay of an inter-station single-difference ionosphere-free combination of a GPS satellite receiver, $\Delta N_{IF,G}^s$ represents an ambiguity of the inter-station single-difference ionosphere-free combination of the GPS satellite s, $\Delta T_G^s$ represents an inter-station single-difference troposphere delay of the GPS satellite, $\Delta\varepsilon_{IF,G}^s$ represents the measurement noise of the inter-station single-difference ionosphere-free combination of the GPS satellite, $\Delta P_{IF,G}^s$ represents a pseudorange observation of the inter-station single-difference ionosphere-free combination of the GPS satellite s, $\Delta d_{IF,G}$ represents a pseudorange hardware delay of the inter-station single-difference ionosphere-free combination of the GPS satellite receiver end, and $\Delta e_{IF,G}^s$ represents a pseudorange measured noise of the inter-station single-difference ionosphere-free combination of the GPS satellite s; $q=1_C, 2_C, \ldots, n_C$, $n_C$ represents a number of BDS satellites, $\Delta\phi_{IF,C}^q$ represents a carrier observation value of an inter-station single-difference ionosphere-free combination of BDS satellite q, $\Delta\rho_C^q$ represents an inter-station single-difference station satellite distance of BDS satellite q, $\lambda_{NL,C}$ represents a BDS narrow-lane wavelength, $\Delta\delta_{IF,C}$ represents a carrier hardware delay of an inter-station single-difference ionosphere-free combination of the BDS receiver, $\Delta N_{IF,C}^q$ represents the ambiguity of the inter-station single-difference ionosphere-free combination of BDS satellite q, $\Delta T_C^q$ represents an inter-station single-difference troposphere delay of BDS satellite q, $\Delta\varepsilon_{IF,C}^q$ represents a measurement noise of the inter-station single-difference ionosphere-free combination of BDS satellite q, $\Delta P_{IF,C}^q$ represents a pseudorange observation of the inter-station single-difference ionosphere-free combination of BDS satellite q, $\Delta d_{IF,C}$ represents a pseudorange hardware delay of the inter-station single-difference ionosphere-free combination of the BDS satellite receiver, and $\Delta e_{IF,C}^q$ represents a pseudorange measurement noise of the inter-station single-difference ionosphere-free combination of BDS satellite q; $\Delta\phi_{1,G}^s$ represents an inter-station single-difference carrier observation on L frequency of GPS satellite s, $\Delta\phi_{2,G}^s$ represents an inter-station single-difference carrier observation on L2 frequency of GPS satellite s, $\Delta N_{1,G}^s$ represents an inter-station single-difference ambiguity on L1 frequency of GPS satellite s, $\Delta N_{2,G}^s$ represents an inter-station single-difference ambiguity on L2 frequency of GPS satellite s, $\Delta P_{1,G}^s$, represents an inter-station single-difference pseudorange observation on L1 frequency of GPS satellites s, $\Delta P_{2,G}^s$ represents an inter-station single-difference pseudorange observation on L2 frequency of GPS satellites s, $f_{1,G}$ represents a GPS L1 frequency, and $f_{2,G}$ represents a GPS L2 frequency; and $\Delta\phi_{1,C}^q$ represents an inter-station single-difference carrier observation on B1 frequency of BDS satellite q, $\Delta\phi_{2,C}^q$ represents an inter-station single-difference carrier observation on B2 frequency of BDS satellite q, $\Delta N_{1,C}^q$ represents the inter-station single-difference ambiguity on B1 frequency of the BDS satellite q, $\Delta N_{2,C}^q$ represents the inter-station single-difference ambiguity on B2 frequency of the BDS satellite q, $\Delta P_{1,C}^q$ represents the inter-station single-difference pseudorange observation on B1 frequency of BDS satellite q, $\Delta P_{2,C}^q$ represents the inter-station single-difference pseudorange observation on B2 frequency of the BDS satellite q, $f_{1,C}$ represents a B1 frequency of BDS, and $f_{2,C}$ represents a B2 frequency of BDS;

step 12: selecting a GPS reference satellite to construct the GPS intra-system double-difference ionosphere-free combination model and the GPS/BDS inter-system double-difference ionosphere-free combination model according to the inter-station single-difference ionosphere-free combination model constructed in the step 11:

when a GPS satellite $1_G$ is used as a reference satellite, equations (8) and (9) representing GPS intra-system double-difference ionosphere-free combination models, and equations (10) and (11) representing GPS/BDS inter-system double-difference ionosphere-free combination models:

$$\nabla\Delta\phi_{IF,G}^{1G,s} = \nabla\Delta\rho_G^{1G,s} + \lambda_{NL,G}\nabla\Delta N_{IF,G}^{1G,s} + \nabla\Delta T_G^{1G,s} + \nabla\Delta\varepsilon_{IF,G}^{1G,s} \quad (8)$$

$$\nabla\Delta P_{IF,G}^{1G,s} = \nabla\Delta\rho_G^{1G,s} + \nabla\Delta T_G^{1G,s} + \nabla\Delta e_{IF,G}^{1G,s} \quad (9)$$

$$\nabla\Delta\phi_{IF,GC}^{1G,q} = \Delta\phi_{IF,C}^q - \Delta\phi_{IF,G}^{1G} = \nabla\Delta\rho_{GC}^{1G,q} + \lambda_{NL,C}\nabla\Delta N_{IF,GC}^{1G,q} + \quad (10)$$
$$(\lambda_{NL,C} - \lambda_{NL,G})\Delta N_{IF,G}^{1G} + \lambda_{NL,C}\nabla\Delta\delta_{IF,GC} + \nabla\Delta T_{GC}^{1G,q} + \nabla\Delta\varepsilon_{IF,GC}^{1G,q}$$

$$\nabla\Delta P_{IF,GC}^{1G,q} = \quad (11)$$
$$\Delta P_{IF,C}^q - \Delta P_{IF,G}^{1G} = \nabla\Delta\rho_{GC}^{1G,q} + \nabla\Delta d_{IF,GC} + \nabla\Delta T_{GC}^{1G,q} + \nabla\Delta e_{IF,GC}^{1G,q}$$

wherein, $\nabla\Delta\phi_{IF,G}^{1G,s}$ represents a carrier observation of the GPS intra-system double-difference ionosphere-free combination, $\nabla\Delta\rho_G^{1G,s}$ represents a GPS intra-system double-difference distance between stations and satellites, $\Delta N_{IF,G}^{1G,s}$ represents a double-difference ambiguity of the GPS intra-system ionosphere-free combination, $\nabla\Delta T_G^{1G,s}$ represents a GPS intra-system double-difference troposphere delay, $\nabla\Delta\varepsilon_{IF,G}^{1G,s}$ represents a carrier observation of the GPS intra-system double-difference ionosphere-free combination, $\nabla\Delta P_{IF,G}^{1G,s}$ represents a pseudorange observation of the GPS intra-system double-difference ionosphere-free combination, and $\nabla\Delta e_{IF,G}^{1G,s}$ represents a carrier measurement noise of the GPS intra-system double-difference ionosphere-free combination; and $\nabla\Delta\phi_{IF,GC}^{1G,q}$ represents a carrier observation of the GPS/BDS inter-system double-difference ionosphere-free combination, $\nabla\Delta\rho_{GC}^{1G,q}$ represents a GPS/BDS inter-system double-difference distance between satellites and stations, $\nabla\Delta N_{IF,GC}^{1G,q}$ represents an ambiguity of the GPS/BDS inter-system double-difference ionosphere-free combination, $\Delta N_{IF,G}^{1G}$ represents an ambiguity of the inter-station single-difference ionosphere-free combination of the GPS reference satellite, $$\nabla\Delta\delta_{IF,GC} = \Delta\delta_{IF,C} - \frac{\lambda_{NL,G}}{\lambda_{NL,C}}\Delta\delta_{IF,G}$$

represents a carrier difference inter-system bias of the GPS/BDS ionosphere-free combination, $\nabla\Delta_{GC}^{1G,q}$ represents a GPS/BDS inter-system double-difference troposphere delay, $\nabla\Delta\varepsilon_{IF,GC}^{1G,q}$ represents a carrier observation of the GPS/BDS inter-system double-difference ionosphere-free combination, $\nabla\Delta P_{IF,GC}^{1G,q}$ represents a pseudorange observation of the GPS/BDS inter-system double-difference ionosphere-free combination, $\nabla\Delta d_{IF,GC} = \Delta d_{IF,C} - \Delta d_{IF,G}$ represents a GPS/BDS pseudorange differential inter-system bias of the ionosphere-free combination, and $\nabla\Delta e_{IF,GC}^{1G,q}$ represents a pseudorange observation of the GPS/BDS inter-system double-difference ionosphere-free combination; and step 13: selecting a BDS reference satellite to construct intra-system double-difference wide-lane ambiguity calculation models of GPS and BDS:

when a BDS satellite $1_C$ is used as a BDS reference satellite, then the respective intra-system double-difference wide-lane ambiguity calculation models of the GPS and the BDS being:

$$\nabla \Delta N_{WL,G}^{1G,s} = \nabla \Delta \varphi_{WL,G}^{1G,s} - \frac{f_{1,G} \nabla \Delta P_{1,G}^{1G,s} + f_{2,G} \nabla \Delta P_{2,G}^{1G,s}}{\lambda_{WL,G}(f_{1,G} + f_{2,G})} \quad (12)$$

$$\nabla \Delta N_{WL,C}^{1C,q} = \nabla \Delta \varphi_{WL,C}^{1C,q} - \frac{f_{1,C} \nabla \Delta P_{1,C}^{1C,q} + f_{2,C} \nabla \Delta P_{2,C}^{1C,q}}{\lambda_{WL,C}(f_{1,C} + f_{2,C})} \quad (13)$$

wherein, $\nabla \Delta N_{WL,G}^{1G,s}$ represents a GPS double-difference wide-lane ambiguity, $\nabla \Delta \varphi_{WL,G}^{1G,s}$ represents a GPS double-difference wide-lane carrier observation, $\nabla \Delta P_{1,G}^{1G,s}$ represents a GPS L1 double-difference pseudorange observation, $\nabla \Delta P_{2,G}^{1G,s}$ represents a GPS L2 double-difference pseudorange observation, and $\lambda_{WL,G}$ represents a GPS wide-lane wavelength; and $\nabla \Delta N_{WL,C}^{1C,q}$ represents a BDS double-difference wide-lane ambiguity, $\nabla \Delta \varphi_{WL,C}^{1C,q}$ represents a BDS double-difference wide-lane carrier observation, $\nabla \Delta P_{1,C}^{1C,q}$ represents a BDS B1 double-difference pseudorange observation, $\nabla \Delta P_{2,C}^{1C,q}$ represents a BDS B2 double-difference pseudorange observation, and $\lambda_{WL,C}$ represents a BDS wide-lane wavelength; and performing multi-epoch smooth rounding on equations (12) and (13) to obtain a double-difference wide-lane whole-cycle ambiguity:

$$\nabla \hat{\Delta} \bar{N}_{WL,G}^{1G,s} = \text{round}\left(\frac{1}{k} \sum_{i=1}^{k} \nabla \hat{\Delta} N_{WL,G}^{1G,s}\right) \quad (14)$$

$$\nabla \hat{\Delta} \bar{N}_{WL,C}^{1C,q} = \text{round}\left(\frac{1}{k} \sum_{i=1}^{k} \nabla \hat{\Delta} N_{WL,C}^{1C,q}\right)$$

$$k \in N^+$$

wherein, $\nabla \hat{\Delta} \bar{N}_{WL,G}^{1G,s}$ and $\nabla \hat{\Delta} \bar{N}_{WL,C}^{1C,q}$ are respectively the double-difference wide-lane whole-cycle ambiguities of the GPS and the BDS obtained by multi-epoch smooth rounding, round represents a rounding operator, and k represents an epoch number.

As a further technical solution of the present invention, the step 2 specifically comprises:

step 21: reparameterizing the ambiguity of the GPS/BDS inter-system double-difference ionosphere-free combination according to the BDS reference satellite selected in the step 13:

according to the step 12, the ambiguity of the GPS/BDS inter-system double-difference ionosphere-free combination being represented as:

$$\nabla \Delta N_{IF,GC}^{1G,q} = (\Delta N_{IF,C}^{q} - \Delta N_{IF,C}^{1C}) + (\Delta N_{IF,C}^{1C} - \Delta N_{IF,G}^{1G}) = \nabla \Delta N_{IF,C}^{1C,q} + \nabla \Delta N_{IF,GC}^{1G1C} \quad (15)$$

wherein, $\Delta N_{IF,C}^{1C}$ represents an ambiguity of an inter-station single-difference ionosphere-free combination of a BDS reference satellite, $\nabla \Delta N_{IF,C}^{1C,q}$ represents an ambiguity of a BDS intra-system double-difference ionosphere-free combination, and $\nabla \Delta N_{IF,GC}^{1G1C}$ represents ambiguities of the GPS/BDS inter-system double-difference ionosphere-free combinations of the BDS reference satellite and the GPS reference satellite;

according to equation (15), equation (10) being represented as:

$$\nabla \Delta \phi_{IF,GC}^{1G,q} = \nabla \Delta \rho_{GC}^{1G,q} + \lambda_{NL,C} \nabla \Delta N_{IF,C}^{1C,q} + \lambda_{NL,C} \nabla \Delta N_{IF,GC}^{1G1C} + (\lambda_{IF,C} - \lambda_{IF,G}) \Delta N_{IF,G}^{1G} + \lambda_{NL,C} \nabla \Delta \delta_{IF,GC}^{1G,q} + \nabla \Delta T_{GC}^{1G,q} + \nabla \Delta \varepsilon_{IF,GC}^{1G,q} \quad (16)$$

wherein, in equation (10), $\nabla \Delta N_{IF,GC}^{1G1C}$, $\Delta N_{IF,G}^{1G}$ and $\nabla \Delta \delta_{IF,GC}$ are parameters shared by all BDS satellites and are linearly correlated; and step 22: combining the shared parameters and reparametrizing the ionosphere-free combination carrier difference inter-system bias to realize parameter decorrelation:

according to equation (16), an observation equation of the GPS/BDS inter-system double-difference ionosphere-free combination after the shared parameters are combined being represented as:

$$\nabla \Delta \phi_{IFGC}^{1G,q} = \nabla \Delta \rho_{GC}^{1G,q} + \lambda_{NL,C} \nabla \Delta N_{NL,C}^{1C,q} + \lambda_{NL,C} \nabla \Delta \bar{\delta}_{IF,GC} + \nabla \Delta T_{GC}^{1G,q} + \nabla \Delta \varepsilon_{IF,GC}^{1G,q} \quad (17)$$

wherein, $\nabla \Delta \bar{\delta}_{IF,GC}$ represents an ionosphere-free combination carrier difference inter-system bias after reparameterization, and $$\nabla \Delta \bar{\delta}_{IF,GC} = \nabla \Delta N_{IF,GC}^{1G1C} + \nabla \Delta \delta_{IF,GC} + \left(1 - \frac{\lambda_{NL,C}}{\lambda_{NL,G}}\right) \Delta N_{IF,G}^{1G}.$$

As a further technical solution of the present invention, the step 3 specifically comprises:

step 31: performing GPS reference conversion:

assuming that the GPS reference satellite is converted from $1_G$ into $i_G$ at a $t^{th}$ epoch, a corresponding ionosphere-free combination carrier difference inter-system bias $\nabla \Delta \bar{\delta}_{IF,GC}(t)$ of the $t^{th}$ epoch being:

$$\nabla \Delta \bar{\delta}_{IF,GC}(t) = \nabla \Delta \bar{\delta}_{IF,GC}(t-1) - \frac{\lambda_{NL,C}}{\lambda_{NL,C}} \nabla \Delta N_{IF,G}^{1G,iG} = \quad (18)$$

$$\nabla \Delta \delta_{IF,GC} + \nabla \Delta N_{IF,GC}^{iG,1C} + \left(1 - \frac{\lambda_{NL,G}}{\lambda_{NL,C}}\right) \Delta N_{IF,G}^{iG}$$

wherein, $\nabla \Delta \bar{\delta}_{IF,GC}(t-1)$ is an ionosphere-free combination carrier difference inter-system bias of a $(t-1)^{th}$ epoch; and step 32: performing BDS reference conversion:

assuming that the BDS reference satellite is converted from $1_C$ into $i_C$ at a $j^{th}$ epoch, while the GPS reference satellite at the moment being $i_G$ in the step 31, then a corresponding ionosphere-free combination carrier difference inter-system bias $\nabla \Delta \bar{\delta}_{IF,GC}(j)$ of the $j^{th}$ epoch being:

$$\nabla \Delta \bar{\delta}_{IF,GC}(j) = \nabla \Delta \bar{\delta}_{IF,GC}(j-1) + \nabla \Delta N_{IF,GC}^{1C,iC} = \quad (19)$$

$$\nabla \Delta \delta_{IF,GC} + \nabla \Delta N_{IF,GC}^{iG,iC} + \left(1 - \frac{\lambda_{NL,G}}{\lambda_{NL,C}}\right) \Delta N_{IF,G}^{iG}$$

wherein, $\nabla \Delta \bar{\delta}_{IF,GC}(j-1)$ is an ionosphere-free combination difference carrier inter-system bias of a $(j-1)^{th}$ epoch;

so far, the continuous estimability of the ionosphere-free combination carrier difference inter-system bias is realized.

As a further technical solution of the present invention, the step 4 specifically comprises:

step 41: separating the ambiguity of the GPS L1 and the ambiguity of BDS B1 according to the wide-lane ambiguity obtained in the step 13 by combining the ionosphere-free combination with a wide-lane combination:

$$\nabla \Delta N_{1,G}^{1G,s} = \nabla \Delta N_{IF,G}^{1G,s} - \frac{f_{2,G}}{f_{1,G} - f_{2,G}} \nabla \Delta \overline{N}_{WL,G}^{1G,s} \qquad (20)$$

$$\nabla \Delta N_{1,C}^{1C,q} = \nabla \Delta N_{IF,C}^{1C,q} - \frac{f_{2,C}}{f_{1,C} - f_{2,C}} \nabla \Delta \overline{N}_{WL,C}^{1C,q} \qquad (21)$$

wherein, $\nabla \Delta N_{1,G}^{1G,s}$ is a separated ambiguity float solution of the GPS L1, $\nabla \Delta N_{1,C}^{1C,q}$ is a separated ambiguity float solution of the BDS B1, $\nabla \Delta \overline{N}_{1,G}^{1G,s}$ is an integer-ambiguity solution of the GPS L1, and $\nabla \Delta \overline{N}_{1,C}^{1C,q}$ is an integer-ambiguity solution of the BDS B1; and step 42: according to the wide-lane ambiguity obtained in the step 13 and the ambiguity of the GPS L1 and the ambiguity of the BDS B1 obtained in the step 41, calculating an integer-ambiguity solution of the GPS L2 and an integer-ambiguity solution of the BDS L2:

$$\nabla \Delta \overline{N}_{2,G}^{1G,s} = \nabla \Delta \overline{N}_{1,G}^{1G,s} - \nabla \Delta \overline{N}_{WL,G}^{1G,s}, \nabla \Delta \overline{N}_{2,C}^{1C,q} = \nabla \Delta \overline{N}_{1,C}^{1C,q} - \nabla \Delta \overline{N}_{WL,C}^{1C,q} \qquad (22)$$

wherein, $\nabla \Delta \overline{N}_{2,G}^{1G,s}$ and $\nabla \Delta \overline{N}_{1,C}^{1C,q}$ are respectively the integer-ambiguity solutions of the GPS L2 and the BDS B2.

As a further technical solution of the present invention, the integer-ambiguity solutions $\nabla \Delta \overline{N}_{1,G}^{1G,s}$ and $\nabla \Delta \overline{N}_{1,C}^{1C,q}$ of the GPS L1 and the BDS B1 are searched by a least-squares ambiguity decorrelation adjustment (LAMBDA) method.

As a further technical solution of the present invention, the step 5 specifically comprises: forming the double-difference ionosphere-free combination according to the step 21 based on the integer-ambiguity solutions and the carrier observations obtained in the step 41 and the step 42, and substituting the formed ionosphere-free combination and the ionosphere-free combination carrier difference inter-system bias obtained in the step 2 into the equations (5) and (7) for positioning.

Compared with the prior art, the present invention employing the above technical solutions has the following technical effects:

(1) the present invention uses GNSS inter-system observations of different frequencies to perform the carrier difference tight combined positioning, thus overcoming the defect that the inter-system observations must have the same frequency in the present researches; and (2) the present invention can reduce parameters to be estimated, which is conductive to enhance the stability of an observation model in an shielded environment, and improves the positioning accuracy and reliability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The present invention will be further described with reference to the drawings and the specific embodiments. It should be understood that these embodiments are only used for illustrating the present invention and are not intended to limit the scope of the present invention, and modifications of various equivalent forms made by those skilled in the art on the present invention after reading the present invention, shall all fall within the scope defined by the appended claims of the present application.

Figure 7:
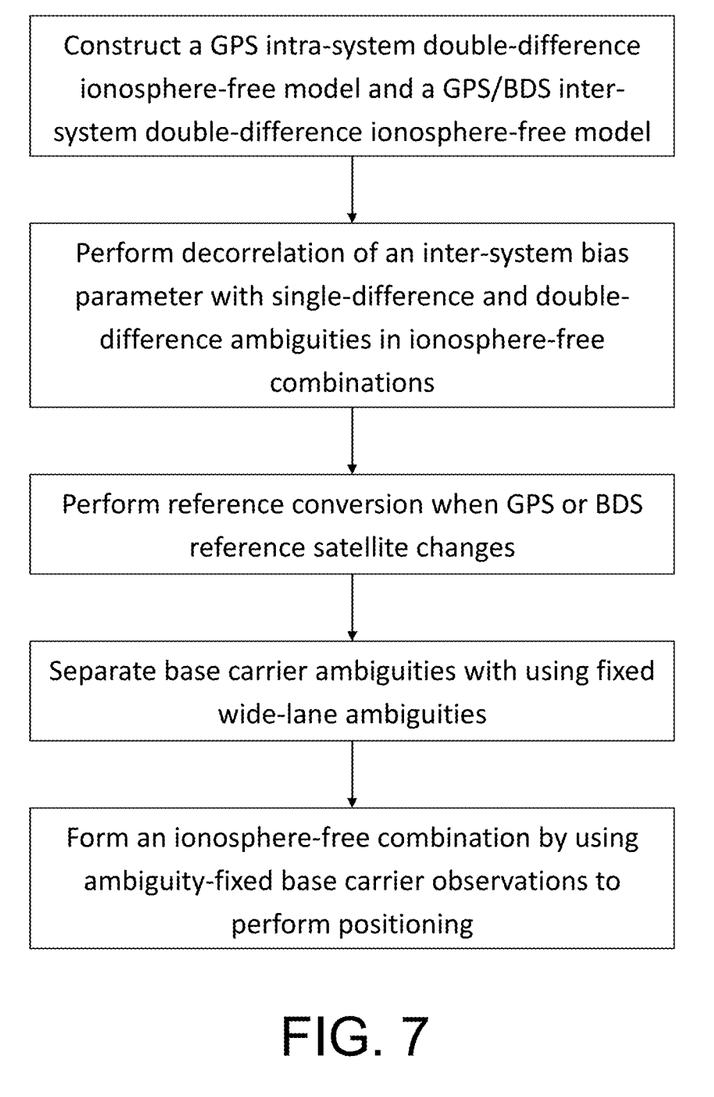
FIG. 7 is a flow chart of a method according to the present invention.

The present invention provides a GPS/BDS tightly combined carrier differential positioning method, as shown in FIG. 7, comprising the following steps of:

step 1: selecting a GPS reference satellite to construct a GPS intra-system double-difference ionosphere-free combination model, a GPS/BDS inter-system double-difference ionosphere-free combination model and a GPS/BDS intra-system double-difference wide-lane ambiguity calculation model;

step 2: realizing decorrelation of an inter-system bias parameter with single-difference and double-difference ambiguities in ionosphere-free combinations;

step 3: performing reference conversion to realize a continuous estimability of an ionosphere-free combination difference inter-system bias;

step 4: separating a base carrier ambiguity by using an ionosphere-free combination and a fixed wide-lane ambiguity; and step 5: forming the ionosphere-free combination by using base carrier observations to perform high-precision positioning.

The constructed GPS intra-system double-difference model and the GPS/BDS inter-system double-difference model in the step 1 comprises the following steps.

In step 11, an inter-station single-difference ionosphere-free combination model is constructed:

assuming that a total of m GPS satellites and n BDS satellites are observed, an observation model of an inter-station single-difference ionosphere-free combination may be represented as:

$$\Delta \phi_{IF,G}^s = \Delta \rho_G^s + \Delta dt + \lambda_{NL,G}(\Delta \delta_{IF,G} + \Delta N_{IF,G}^s) + \Delta T_G^s + \Delta \varepsilon_{IF,G}^s \qquad (1)$$

$$\Delta P_{IF,G}^s = \Delta \rho_G^s + \Delta dt + \Delta d_{IF,G} + \Delta T_G^s + \Delta e_G^s \qquad (2)$$

$$\Delta \phi_{IF,C}^q = \Delta \rho_C^q + \Delta dt + \lambda_{NL,C}(\Delta \delta_{IF,C} + \Delta N_{IF,C}^q) + \Delta T_C^q + \Delta \varepsilon_{IF,C}^q \qquad (3)$$

$$\Delta P_{IF,C}^q = \Delta \rho_C^q + \Delta dt + \Delta d_{IF,C} + \Delta T_C^q + \Delta e_{IF,C}^q \qquad (4)$$

$$\Delta \phi_{IF,G}^s = \frac{f_{1,G}^2 \Delta \phi_{1,G}^s}{f_{1,G}^2 - f_{2,G}^2} - \frac{f_{2,G}^2 \Delta \phi_{2,G}^s}{f_{1,G}^2 - f_{2,G}^2} \quad \Delta N_{IF,G}^s = \frac{f_{1,G}^2 \Delta N_{1,G}^s}{f_{1,G}^2 - f_{2,G}^2} - \frac{f_{2,G}^2 \Delta N_{2,G}^s}{f_{1,G}^2 - f_{2,G}^2} \qquad (5)$$

-continued $$\Delta\phi_{IF,C}^q = \frac{f_{1,C}^2 \Delta\phi_{1,C}^q}{f_{1,C}^2 - f_{2,C}^2} - \frac{f_{2,G}^2 \Delta\phi_{2,C}^q}{f_{1,G}^2 - f_{2,C}^2} \quad \Delta N_{IF,C}^q = \frac{f_{1,C}^2 \Delta N_{1,C}^q}{f_{1,C}^2 - f_{2,C}^2} - \frac{f_{2,C}^2 \Delta N_{2,C}^q}{f_{1,C}^2 - f_{2,C}^2} \quad (6)$$

$$\Delta P_{IF,G}^s = \frac{f_{1,G}^2 \Delta P_{1,G}^s}{f_{1,G}^2 - f_{2,G}^2} - \frac{f_{2,G}^2 \Delta P_{2,G}^s}{f_{1,G}^2 - f_{2,G}^2} \quad \Delta P_{IF,C}^q = \frac{f_{1,C}^2 \Delta P_{1,C}^q}{f_{1,C}^2 - f_{2,C}^2} - \frac{f_{2,G}^2 \Delta P_{2,C}^q}{f_{1,G}^2 - f_{2,C}^2} \quad (7)$$

wherein equations (1) and (2) respectively represent a carrier observation equation and a pseudorange observation equation of a GPS inter-station single-difference ionosphere-free combination, equations (3) and (4) respectively represent a subcarrier observation equation and a pseudorange observation equation of a BDS inter-station single-difference ionosphere-free combination, equation (5) represents a GPS inter-station single-difference ionosphere-free carrier observation and a GPS inter-station single-difference ionosphere-free ambiguity, equation (6) represents a BDS inter-station single-difference ionosphere-free carrier observation value and a BDS inter-station single-difference ionosphere-free ambiguity, and equation (7) represents a GPS inter-station single-difference pseudorange ionosphere-free combination and a BDS inter-station single-difference pseudorange ionosphere-free combination. The ionosphere-free combination forms shown in the equations (5), (6) and (7) are also applicable to a non-difference form and a double-difference form.

$\Delta\phi_{IF,G}^s$ (a superscript $s=1_G, 2_G, \ldots, m_G$, $m_G$ represents a GPS satellite) represents a carrier observation (m) of an inter-station single-difference ionosphere-free combination of a GPS satellite, $\Delta\rho_G^s$ represents a single-difference distance between a station and the GPS satellite, $\Delta dt$ represents an inter-station single-difference receiver clock bias, $\lambda_{NL,G}$ represents a GPS narrow-lane wavelength, $\Delta\delta_{IF,G}$ represents a carrier hardware delay of an inter-station single-difference ionosphere-free combination of a GPS satellite receiver, $\Delta N_{IF,G}^s$ represents an ambiguity of the inter-station single-difference ionosphere-free combination of the GPS satellite s, $\Delta T_G^s$ represents an inter-station single-difference troposphere delay of the GPS satellite, $\Delta\epsilon_{IF,G}^s$ represents the measurement noise of the inter-station single-difference ionosphere-free combination of the GPS satellite, $\Delta P_{IF,G}^s$ represents a pseudorange observation of the inter-station single-difference ionosphere-free combination of the GPS satellite s, $\Delta d_{IF,G}$ represents a pseudorange hardware delay of the inter-station single-difference ionosphere-free combination of the GPS satellite receiver end, and $\Delta e_{IF,G}^s$ represents a pseudorange measured noise of the inter-station single-difference ionosphere-free combination of the GPS satellite s; and $\Delta\phi_{IF,C}^q$ (a superscript $q=1_C, 2_C, \ldots, n_C, n_C$ represents a BDS satellite) represents a carrier observation (m) of an inter-station single-difference ionosphere-free combination of a BDS satellite, $\Delta\rho_C^q$ represents an inter-station single-difference station satellite distance of BDS satellite q, $\lambda_{NL,C}$ represents a BDS narrow-lane wavelength, $\Delta\delta_{IF,C}$ represents a carrier hardware delay of an inter-station single-difference ionosphere-free combination of the BDS receiver, $\Delta N_{IF,C}^q$ represents the ambiguity of the inter-station single-difference ionosphere-free combination of BDS satellite q, $\Delta T_C^q$ represents an inter-station single-difference troposphere delay of BDS satellite q, $\Delta\epsilon_{IF,C}^q$ represents a measurement noise of the inter-station single-difference ionosphere-free combination of BDS satellite q, $\Delta P_{IF,C}^q$ represents a pseudorange observation of the inter-station single-difference ionosphere-free combination of BDS satellite q, $\Delta d_{IF,C}$ represents a pseudorange hardware delay of the inter-station single-difference ionosphere-free combination of the BDS satellite receiver, and $\Delta e_{IF,C}^q$ represents a pseudorange measurement noise of the inter-station single-difference ionosphere-free combination of BDS satellite q; $\Delta\phi_{1,G}^s$ represents an inter-station single-difference carrier observation on L frequency of GPS satellite s, $\Delta_{2,G}^s$ represents an inter-station single-difference carrier observation on L2 frequency of GPS satellite s, $\Delta N_{1,G}^s$ represents an inter-station single-difference ambiguity on L1 frequency of GPS satellite s, $\Delta N_{2,G}^s$ represents an inter-station single-difference ambiguity on L2 frequency of GPS satellite s, $\Delta P_{1,G}^s$ represents an inter-station single-difference pseudorange observation on L1 frequency of GPS satellites s, $\Delta P_{2,G}^s$ represents an inter-station single-difference pseudorange observation on L2 frequency of GPS satellites s, $f_{1,G}$ represents a GPS L frequency, and $f_{2,G}$ represents a GPS L2 frequency; and $\Delta\phi_{1,C}^s$ represents an inter-station single-difference carrier observation on B1 frequency of BDS satellite q, $\Delta\phi_{2,C}^q$ represents an inter-station single-difference carrier observation on B2 frequency of BDS satellite q, $\Delta N_{1,C}^q$ represents the inter-station single-difference ambiguity on B1 frequency of the BDS satellite q, $\Delta N_{2,C}^q$ represents the inter-station single-difference ambiguity on B2 frequency of the BDS satellite q, $\Delta P_{1,C}^q$ represents the inter-station single-difference pseudorange observation on B1 frequency of BDS satellite q, $\Delta P_{2,C}^q$ represents the inter-station single-difference pseudorange observation on B2 frequency of the BDS satellite q, $f_{1,C}$ represents a B1 frequency of BDS, and $f_{2,C}$ represents a B2 frequency of BDS;

In step 12, a GPS reference satellite is selected to construct the GPS intra-system double-difference ionosphere-free combination model and the GPS/BDS inter-system double-difference ionosphere-free combination model according to the inter-station single-difference ionosphere-free combination model constructed in the step 11:

assuming that a GPS satellite $1_G$ is used as a reference satellite, the model constructed may be represented as:

$$\nabla\Delta\phi_{IF,G}^{1_G,s} = \nabla\Delta\rho_G^{1_G,s} + \lambda_{NL,G}\Delta N_{IF,G}^{1_G,s} + \nabla\Delta T_G^{1_G,s} + \nabla\Delta\epsilon_{IF,G}^{1_G,s} \quad (8)$$

$$\nabla\Delta P_G^{1_G,s} = \nabla\Delta\rho_G^{1_G,s} + \nabla\Delta T_G^{1_G,s} + \nabla\Delta e_{IF,G}^{1_G,s} \quad (9)$$

$$\nabla\Delta\phi_{IF,GC}^{1_G,q} = \Delta\phi_{IF,C}^q - \Delta\phi_{IF,G}^{1_G} = \nabla\Delta\rho_{GC}^{1_G,q} + \lambda_{NL,C}\nabla\Delta N_{IF,GC}^{1_G,q} + \quad (10)$$
$$(\lambda_{NL,C} - \lambda_{NL,G})\Delta N_{IF,G}^{1_G} + \lambda_{NL,C}\nabla\Delta\delta_{IF,GC} + \nabla\Delta T_{GC}^{1_G,q} + \nabla\Delta\epsilon_{IF,GC}^{1_G,q}$$

$$\nabla\Delta P_{IF,GC}^{1_G,q} = \quad (11)$$
$$\Delta P_{IF,C}^q - \Delta P_{IF,G}^{1_G} = \nabla\Delta\rho_{GC}^{1_G,q} + \nabla\Delta d_{IF,GC} + \nabla\Delta T_{GC}^{1_G,q} + \nabla\Delta e_{IF,GC}^{1_G,q}$$

wherein, equations (8) and (9) represent GPS intra-system double-difference ionosphere-free combination models, and equations (10) and (11) represent GPS/BDS inter-system double-difference ionosphere-free combination models.

$$\nabla\Delta\delta_{IF,GC} = \Delta\delta_{IF,C} - \frac{\lambda_{NL,G}}{\lambda_{NL,C}}\Delta\delta_{IF,G}$$

represents a carrier differential inter-system bias of a GPS/BDS ionosphere-free combination, $\nabla\Delta d_{IF,GC} = \Delta d_{IF,C} - \Delta d_{IF,G}$ represents a pseudorange differential inter-system bias of the GPS/BDS ionosphere-free combination, $\nabla\Delta\phi_{IF,G}^{1_G,s}$ represents a carrier observation of the GPS intra-system double-difference ionosphere-free combination, $\nabla\Delta\rho_G^{1G,s}$ represents a GPS intra-system double-difference station satellite distance, $\Delta N_{IF,G}^{1G,s}$ represents an ambiguity of the GPS intra-system double-difference ionosphere-free combination, $\nabla\Delta T_G^{1G,s}$ represents a GPS intra-system double-difference troposphere delay, $\nabla\Delta\varepsilon_{IF,G}^{1G,s}$ represents a carrier observation noise of the GPS intra-system double-difference ionosphere-free combination, $\nabla\Delta P_{IF,G}^{1G,s}$ represents a pseudorange observation of the GPS intra-system double-difference ionosphere-free combination, and $\nabla\Delta e_{IF,G}^{1G,s}$ represents a carrier observation noise of the GPS intra-system double-difference ionosphere-free combination; and $\nabla\Delta\phi_{IF,GC}^{1G,q}$ represents a carrier observation of the GPS/BDS inter-system double-difference ionosphere-free combination, $\nabla\Delta\rho_{GC}^{1G,q}$ represents a GPS/BDS inter-system double-difference distance between satellites and stations, $\nabla\Delta N_{IF,GC}^{1G,q}$ represents an ambiguity of the GPS/BDS inter-system double-difference ionosphere-free combination, $\Delta N_{IF,G}^{1G}$ represents an ambiguity of the inter-station single-difference ionosphere-free combination of the GPS reference satellite, $\nabla\Delta T_{GC}^{1G,q}$ represents a GPS/BDS inter-system double-difference troposphere delay, $\nabla\Delta\varepsilon_{IF,GC}^{1G,q}$ represents a carrier observation of the GPS/BDS inter-system double-difference ionosphere-free combination, $\nabla\Delta_{IF,GC}^{1G,q}$ represents a pseudorange observation of the GPS/BDS inter-system double-difference ionosphere-free combination, and $\nabla\Delta e_{IF,GC}^{1G,q}$ represents a pseudorange observation of the GPS/BDS inter-system double-difference ionosphere-free combination.

In step 13, a BDS reference satellite is selected to construct intra-system double-difference wide-lane ambiguity calculation models of GPS and BDS:

assuming that a BDS satellite $1_C$ is used as a BDS reference satellite, then the respective intra-system double-difference wide-lane ambiguity calculation models of the GPS and the BDS are represented as:

$$\nabla\Delta_{WL,G}^{1G,s} = \nabla\Delta\varphi_{WL,G}^{1G,s} - \frac{f_{1,G}\nabla\Delta P_{1,G}^{1G,s} + f_{2,G}\nabla\Delta P_{2,G}^{1G,s}}{\lambda_{WL,G}(f_{1,G}+f_{2,G})} \quad (12)$$

$$\nabla\Delta_{WL,C}^{1C,q} = \nabla\Delta\varphi_{WL,C}^{1C,q} - \frac{f_{1,C}\nabla\Delta P_{1,C}^{1C,q} + f_{2,C}\nabla\Delta P_{2,C}^{1C,q}}{\lambda_{WL,C}(f_{1,C}+f_{2,C})} \quad (13)$$

wherein, equations (12) and (13) are respectively the GPS intra-system double-difference wide-lane ambiguity calculation model and the BDSS intra-system double-difference wide-lane ambiguity calculation model.

$\nabla\Delta N_{WL,G}^{1G,s}$ represents a GPS double-difference wide-lane ambiguity, $\nabla\Delta\phi_{WL,G}^{1G,s}$ represents a GPS double-difference wide-lane carrier observation (weekly), $\nabla\Delta P_{1,G}^{1G,s}$ represents a GPS L1 double-difference pseudorange observation, $\nabla\Delta P_{2,G}^{1G,s}$ represents a GPS L2 double-difference pseudorange observation, and $\lambda_{WL,G}$ represents a GPS wide-lane wavelength; and $\nabla\Delta N_{WL,C}^{1C,q}$ represents a BDS double-difference wide-lane ambiguity, $\nabla\Delta\phi_{WL,C}^{1C,q}$ represents a BDS double-difference wide-lane carrier observation (weekly), $\nabla\Delta P_{1,C}^{1C,q}$ represents a BDS B1 double-difference pseudorange observation, $\nabla\Delta P_{2,C}^{1C,q}$ represents a BDS B2 double-difference pseudorange observation, and $\lambda_{WL,C}$ represents a BDS wide-lane wavelength.

Multi-epoch smooth rounding is performed on equations (12) and (13) to obtain a double-difference wide-lane whole-cycle ambiguity, which is represented as:

$$\nabla\Delta\bar{N}_{WL,G}^{1G,s} = \mathrm{round}\left(\frac{1}{k}\sum_{i=1}^{k}\nabla\Delta N_{WL,G}^{1G,s}\right) \quad (14)$$

$$\nabla\Delta\bar{N}_{WL,C}^{1C,q} = \mathrm{round}\left(\frac{1}{k}\sum_{i=1}^{k}\nabla\Delta N_{WL,C}^{1C,q}\right) k \in N^+$$

wherein, $\nabla\Delta\hat{N}_{WL,G}^{1G,s}$ and $\nabla\Delta\hat{N}_{WL,C}^{1C,q}$ are respectively the double-difference wide-lane whole-cycle ambiguities of the GPS and the BDS obtained by multi-epoch smooth rounding, round represents a rounding operator, and k represents an epoch number.

The realizing the decorrelation of the inter-system bias parameter in the ionosphere-free combination form with the single-difference and double-difference ambiguities in the step 2 comprises the following steps.

In step 21, the ambiguity of the GPS/BDS inter-system double-difference ionosphere-free combination is reparametrized according to the BDS reference satellite selected in the step 13:

according to the step 12, the ambiguity of the GPS/BDS inter-system double-difference ionosphere-free combination is represented as:

$$\nabla\Delta N_{IF,G}^{1G,q} = (\Delta N_{IF,C}^{q} - \Delta N_{IF,C}^{1C}) + (\Delta N_{IF,C}^{1C} - \Delta N_{IF,G}^{1G}) = \nabla\Delta N_{IF,C}^{1C,q} + \nabla\Delta N_{IF,GC}^{1G1C} \quad (15)$$

wherein, $\Delta N_{IF,C}^{1C}$ represents an ambiguity of an inter-station single-difference ionosphere-free combination of a BDS reference satellite, $\nabla\Delta N_{IF,C}^{1C,q}$ represents an ambiguity of a BDS intra-system double-difference ionosphere-free combination, and $\nabla\Delta N_{IF,C}^{1G1C}$ represents ambiguities of the GPS/BDS inter-system double-difference ionosphere-free combinations of the BDS reference satellite and the GPS reference satellite.

According to equation (15), equation (10) is represented as:

$$\nabla\Delta\phi_{IF,GC}^{1G,q} = \nabla\Delta\rho_{GC}^{1G,q} + \lambda_{NL,C}\nabla\Delta N_{IF,C}^{1C,q} + \lambda_{NL,C}\nabla\Delta N_{IF,GC}^{1G1C} + (\lambda_{IF,C}-\lambda_{IF,G})\Delta N_{IF,G}^{1G} + \lambda_{NL,C}\nabla\Delta\delta_{IF,GC} + \nabla\Delta T_{GC}^{1G,q} + \nabla\Delta\varepsilon_{IF,GC}^{1G,q} \quad (16)$$

wherein, in equation (10), $\nabla\Delta N_{IF,GC}^{1G1C}$, $\Delta N_{IF,G}^{1G}$ and $\nabla\Delta\delta_{IF,GC}$ are parameters shared by all BDS satellites and are linearly correlated.

In step 22, the shared parameters are combined and the ionosphere-free combination carrier difference inter-system bias is reparametrized to realize parameter decorrelation:

according to equation (16), an observation equation of the GPS/BDS inter-system double-difference ionosphere-free combination after the shared parameters are combined is represented as:

$$\nabla\Delta\phi_{IFGC}^{1G,q} = \nabla\Delta\rho_{GC}^{1G,q} + \lambda_{NL,C}\nabla\Delta N_{NL,C}^{1C,q} + \lambda_{NL,C}\nabla\Delta\bar{\delta}_{IF,GC} + \nabla\Delta T_{GC}^{1G,q} + \nabla\Delta\varepsilon_{IF,GC}^{1G,q} \quad (17)$$

wherein, $$\nabla\Delta\bar{\delta}_{IF,GC} = \nabla\Delta N_{IF,GC}^{1G1C} + \nabla\Delta\delta_{IF,GC} + \left(1-\frac{\lambda_{NL,C}}{\lambda_{NL,G}}\right)\Delta N_{IF,G}^{1G},$$

$\nabla\Delta\bar{\delta}_{IF,GC}$ represents an ionosphere-free combination carrier difference inter-system bias after reparameterization, and a $\nabla\Delta\bar{\delta}_{IF,GC}$ form will be used as the ionosphere-free combination carrier difference inter-system bias hereinafter.

The performing the reference conversion to realize the continuous estimability of the ionosphere-free combination difference inter-system bias in the step 3 comprises the following steps.

In step 31, GPS reference conversion is performed:

assuming that the GPS reference satellite is converted from $1_G$ into $i_G$ at a $t^{th}$ epoch, a corresponding ionosphere-free combination carrier difference inter-system bias $\nabla\Delta\bar{\delta}_{IF,GC}(t)$ of the $t^{th}$ epoch is:

$$\nabla\Delta\bar{\delta}_{IF,GC}(t) = \nabla\Delta\bar{\delta}_{IF,GC}(t-1) - \frac{\lambda_{NL,G}}{\lambda_{NL,C}}\Delta\nabla N_{IF,G}^{1G,iG} = \quad (18)$$

$$\nabla\Delta\delta_{IF,GC} + \nabla\Delta N_{IF,GC}^{iG,1C} + \left(1 - \frac{\lambda_{NL,G}}{\lambda_{NL,C}}\right)\Delta N_{IF,G}^{iG}$$

wherein, $\nabla\Delta\bar{\delta}_{IF,GC}(t-1)$ is an ionosphere-free combination carrier difference inter-system bias of a $(t-1)^{th}$ epoch.

In step 32, BDS reference conversion is performed:

assuming that the BDS reference satellite is converted from $1_C$ into $i_C$ at a $j^{th}$ epoch, while the GPS reference satellite at the moment is $i_G$ in the step 41, then a corresponding ionosphere-free combination carrier difference inter-system bias $\nabla\Delta\bar{\delta}_{IF,GC}(j)$ of the $j^{th}$ epoch is:

$$\nabla\Delta\bar{\delta}_{IF,GC}(j) = \nabla\Delta\bar{\delta}_{IF,GC}(j-1) + \nabla\Delta N_{IF,GC}^{1C,iC} = \quad (19)$$

$$\nabla\Delta\delta_{IF,GC} + \nabla\Delta N_{IF,GC}^{iG,iC} + \left(1 - \frac{\lambda_{NL,G}}{\lambda_{NL,C}}\right)\Delta N_{IF,G}^{iG}$$

wherein, $\nabla\Delta\bar{\delta}_{IF,GC}(j-1)$ is an ionosphere-free combination difference carrier inter-system bias of a $(j-1)^{th}$ epoch. So far, the continuous estimability of the ionosphere-free combination carrier difference inter-system bias is realized.

The separating the base carrier ambiguity by using the ionosphere-free combination and the wide-lane ambiguity in the step 4 comprises the following steps.

In step 41, the ambiguity of the GPS L1 is separated from the ambiguity of the BDS B1 according to the wide-lane ambiguity obtained in the step 13 by combining the ionosphere-free combination with a wide-lane combination:

$$\nabla\Delta N_{1,G}^{1G,s} = \nabla\Delta N_{IF,G}^{1G,s} - \frac{f_{2,G}}{f_{1,G} - f_{2,G}}\nabla\Delta\bar{N}_{WL,G}^{1G,s} \quad (20)$$

$$\nabla\Delta N_{1,C}^{1C,q} = \nabla\Delta N_{IF,C}^{1C,q} - \frac{f_{2,C}}{f_{1,C} - f_{2,C}}\nabla\Delta\bar{N}_{WL,C}^{1C,s} \quad (21)$$

wherein, $\nabla\Delta N_{1,G}^{1G,s}$ is a separated ambiguity float solution of the GPS L1, and $\nabla\Delta N_{1,C}^{1C,q}$ is a separated ambiguity float solution of the BDS B1. Integer-ambiguity solutions $\nabla\Delta\bar{N}_{1,G}^{1G,s}$ and $\nabla\Delta\bar{N}_{1,C}^{1C,q}$ of the GPS L1 and the BDS B1 are searched by a least-squares ambiguity decorrelation adjustment (LAMBDA) method.

In step 42, according to the wide-lane ambiguity obtained in the step 13 and the ambiguity of the GPS L1 and the ambiguity of the BDS B1 obtained in the step 41, an integer-ambiguity solution of the GPS L2 and an integer-ambiguity solution of the BDS L2 are calculated:

$$\nabla\Delta\bar{N}_{2,G}^{1G,s} = \nabla\Delta\bar{N}_{1,G}^{1G,s} - \nabla\Delta\bar{N}_{WL,G}^{1G,s}, \nabla\Delta\bar{N}_{2,C}^{1C,q} = \nabla\Delta\bar{N}_{1,C}^{1C,q} - \nabla\Delta\bar{N}_{WL,C}^{1C,q} \quad (22)$$

wherein, $\nabla\Delta N_{2,G}^{1G,s}$ and $\nabla\Delta N_{2,C}^{1C,q}$ are respectively the integer-ambiguity solutions of the GPS L2 and the BDS B2.

The forming the ionosphere-free combination by using the base carrier observations to perform high-precision positioning in the step 5 comprises the following step.

In step 51, the double-difference ionosphere-free combination is formed according to the step 21 based on the integer-ambiguity solutions and the carrier observations obtained in the step 41 and the step 42, and the formed ionosphere-free combination and the ionosphere-free combination carrier difference inter-system bias obtained in the step 2 are substituted into the equations (5) and (7) for positioning. It shall be noted that the ionosphere-free combination carrier difference inter-system bias must be consistent with the reference satellites of the equations (5) and (7).

Figure 1:
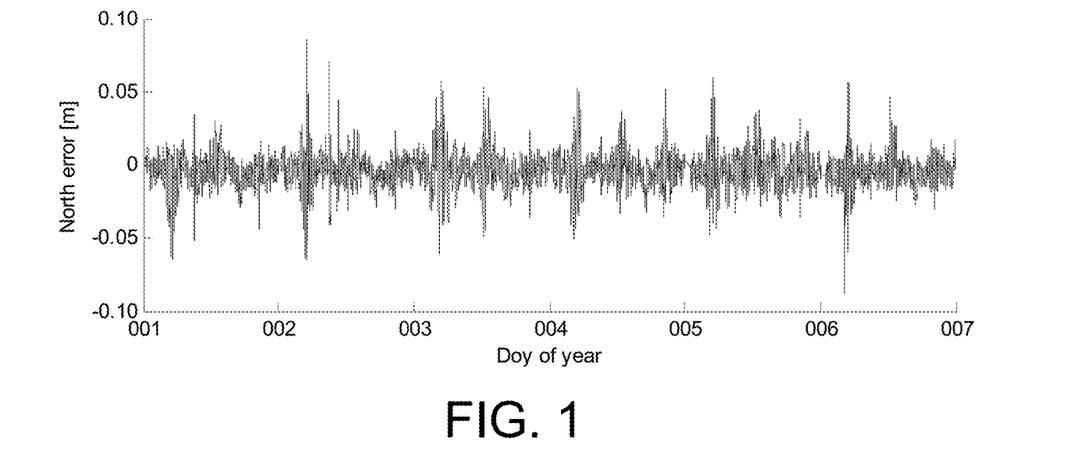
FIG. 1 is a seven-day positioning bias diagram of a loose combination in an N direction.
Figure 2:
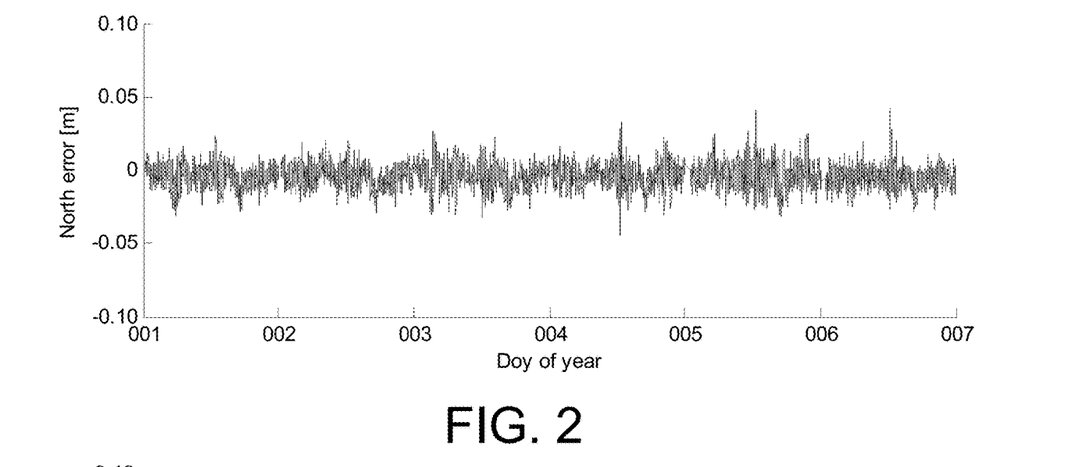
FIG. 2 is a seven-day positioning bias diagram of a tight combination in the N direction.
Figure 3:
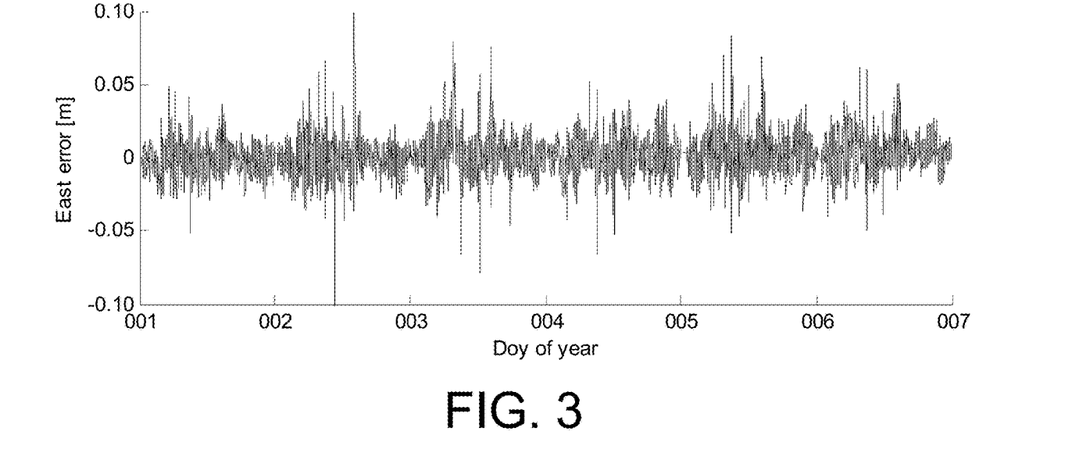
FIG. 3 is a seven-day positioning bias diagram of the loose combination in an E direction.
Figure 4:
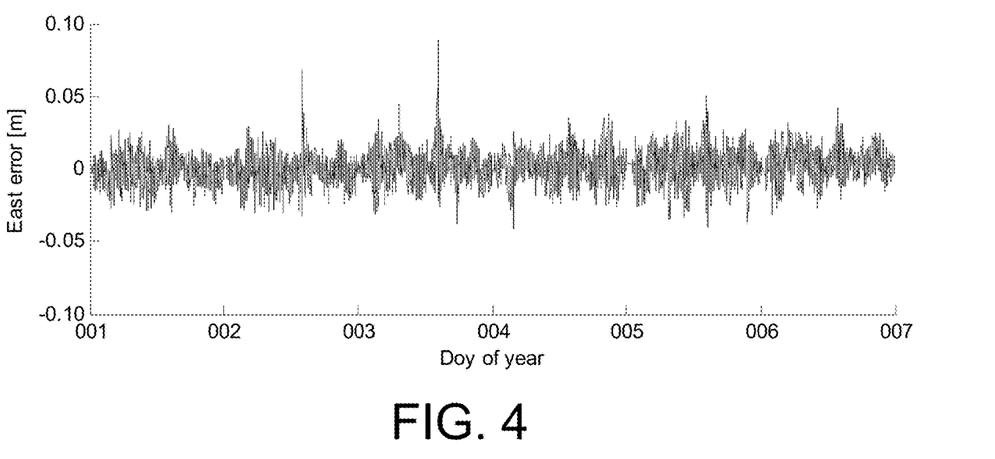
FIG. 4 is a seven-day positioning bias diagram of the tight combination in the E direction.
Figure 5:
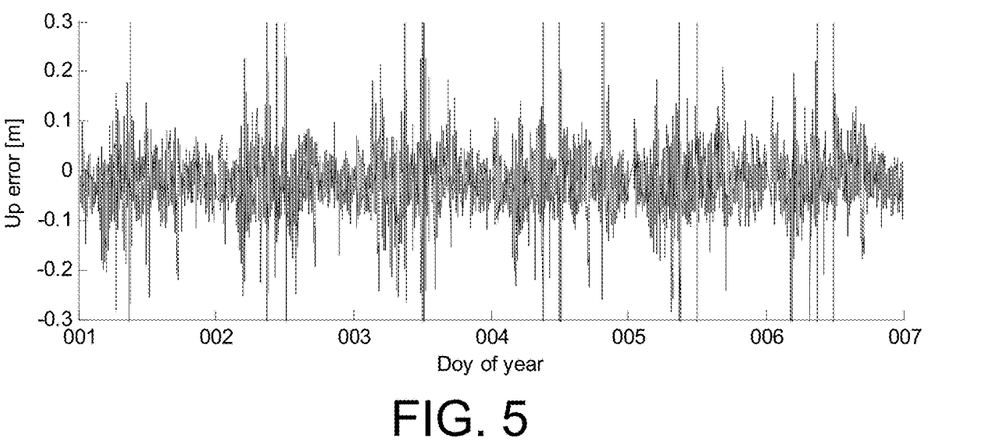
FIG. 5 is a seven-day positioning bias diagram of the loose combination in a U direction.
Figure 6:
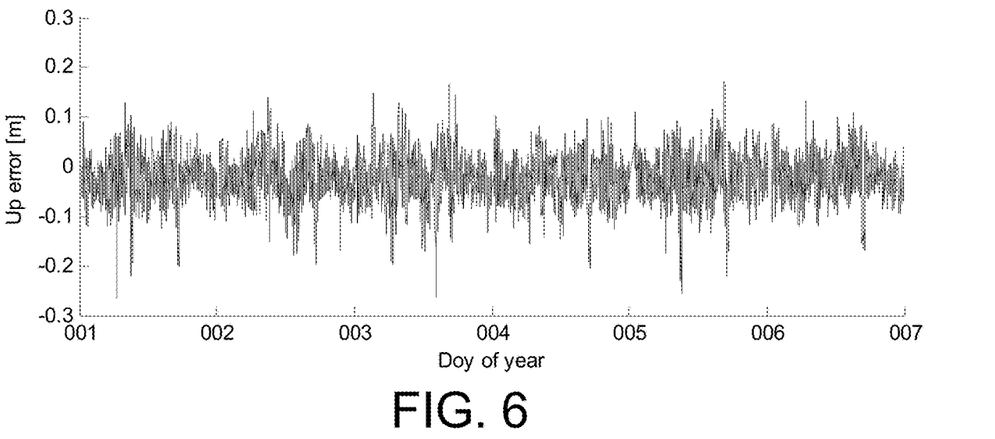
FIG. 6 is a seven-day positioning bias diagram of the tight combination in the U direction.

The positioning bias is shown in FIGS. 1 to 6, wherein FIGS. 1, 3 and 5 respectively illustrate positioning bias diagrams of a loose combination in N/E/U directions, and FIGS. 2, 4 and 5 respectively illustrate positioning bias diagrams of a tight combination in the N/E/U directions.

According to method, the GPS is used as the reference system to form the ionosphere-free combination to perform GPS/BDS inter-system tight combined carrier differential positioning. The inter-system bias in the carrier ionosphere-free combination form is estimated in real time, the base carrier ambiguity is separated by using the ionosphere-free combination and the wide-lane combination, and the ionosphere-free combination is finally formed by using the base carrier to perform tight combined differential positioning.

The foregoing is only the specific embodiments in the present invention, but the protection scope of the present invention is not limited to the embodiments. Any changes or substitutions that can be understood and thought of by those skilled in the art within the technical scope disclosed by the present invention shall be included within the scope of the present invention. Therefore, the protection scope of the present invention shall be subject to the protection scope of the claims.

What is claimed is:

1. A tightly combined GPS/BDS carrier differential positioning method, comprising the following steps of:
   step 1: selecting a GPS reference satellite by a processor to construct a GPS intra-system double-difference ionosphere-free combination model, a GPS/BDS inter-system double-difference ionosphere-free combination model and a GPS/BDS intra-system double-difference wide-lane ambiguity calculation model;
   step 2: realizing decorrelation of an inter-system bias parameter with single-difference and double-difference ambiguities in ionosphere-free combinations by the processor;
   step 3: performing reference conversion by the processor to realize a continuous estimability of an ionosphere-free combination difference inter-system bias;
   step 4: separating a base carrier ambiguity by the processor using an ionosphere-free combination and a fixed wide-lane ambiguity; and
   step 5: forming the ionosphere-free combination by the processor using base carrier observations to perform high-precision positioning.

2. The tightly combined GPS/BDS carrier differential positioning method according to claim 1, wherein the step 1 specifically comprises:
   step 11: constructing an inter-station single-difference ionosphere-free combination model by the processor:

$$\Delta\phi_{IF,G}^s = \Delta\rho_G^s + \Delta dt + \lambda_{NL,G}(\Delta\delta_{IF,G} + \Delta N_{IF,G}^s) + \Delta T_G^s + \Delta\varepsilon_{IF,G}^s \quad (1)$$

$$\Delta P_{IF,G}^s = \Delta\rho_G^s + \Delta dt + \Delta d_{IF,G} + \Delta T_G^s + \Delta e_{IF,G}^s \quad (2)$$

-continued $$\Delta \phi_{IF,C}^q = \Delta \rho_C^q + \Delta dt + \lambda_{NL,C}(\Delta \delta_{IF,C} + \Delta N_{IF,C}^q) + \Delta T_C^q + \Delta \varepsilon_{IF,C}^q \quad (3)$$

$$\Delta P_{IF,C}^q = \Delta \rho_C^q + \Delta dt + \Delta d_{IF,C} + \Delta T_C^q + \Delta e_{IF,C}^q \quad (4)$$

$$\Delta \phi_{IF,G}^s = \frac{f_{1,G}^2 \Delta \phi_{1,G}^s}{f_{1,G}^2 - f_{2,G}^2} - \frac{f_{2,G}^2 \Delta \phi_{2,G}^s}{f_{1,G}^2 - f_{2,G}^2} \quad (5)$$

$$\Delta N_{IF,G}^s = \frac{f_{1,G}^2 \Delta N_{1,G}^s}{f_{1,G}^2 - f_{2,G}^2} - \frac{f_{2,G}^2 \Delta N_{2,G}^s}{f_{1,G}^2 - f_{2,G}^2}$$

$$\Delta \phi_{IF,C}^q = \frac{f_{1,C}^2 \Delta \phi_{1,C}^q}{f_{1,C}^2 - f_{2,C}^2} - \frac{f_{2,G}^2 \Delta \phi_{2,C}^q}{f_{1,G}^2 - f_{2,C}^2} \quad (6)$$

$$\Delta N_{IF,C}^q = \frac{f_{1,C}^2 \Delta N_{1,C}^q}{f_{1,C}^2 - f_{2,C}^2} - \frac{f_{2,C}^2 \Delta N_{2,C}^q}{f_{1,C}^2 - f_{2,C}^2}$$

$$\Delta P_{IF,G}^s = \frac{f_{1,G}^2 \Delta P_{1,G}^s}{f_{1,G}^2 - f_{2,G}^2} - \frac{f_{2,G}^2 \Delta P_{2,G}^s}{f_{1,G}^2 - f_{2,G}^2} \quad (7)$$

$$\Delta P_{IF,C}^q = \frac{f_{1,C}^2 \Delta P_{1,C}^q}{f_{1,C}^2 - f_{2,C}^2} - \frac{f_{2,G}^2 \Delta P_{2,C}^q}{f_{1,G}^2 - f_{2,C}^2}$$

wherein equations (1) and (2) respectively represent a carrier observation equation and a pseudorange observation equation of a GPS inter-station single-difference ionosphere-free combination, equations (3) and (4) respectively represent a subcarrier observation equation and a pseudorange observation equation of a BDS inter-station single-difference ionosphere-free combination, equation (5) represents a GPS inter-station single-difference ionosphere-free carrier observation and a GPS inter-station single-difference ionosphere-free ambiguity, equation (6) represents a BDS inter-station single-difference ionosphere-free carrier observation value and a BDS inter-station single-difference ionosphere-free ambiguity, and equation (7) represents a GPS inter-station single-difference pseudorange ionosphere-free combination and a BDS inter-station single-difference pseudorange ionosphere-free combination;

wherein, $s=1_G, 2_G, \ldots, m_G$, $m_G$ represents a number of GPS satellites, $\Delta \phi_{IF,G}^s$ represents a carrier observation of an inter-station single-difference ionosphere-free combination of GPS satellite s, $\Delta \rho_G^s$ represents a single-difference distance between a station and the GPS satellite, $\Delta dt$ represents an inter-station single-difference receiver clock bias, $\lambda_{NL,G}$ represents a GPS narrow-lane wavelength, $\Delta \delta_{IF,G}$ represents a carrier hardware delay of an inter-station single-difference ionosphere-free combination of a GPS satellite receiver, $\Delta N_{IF,G}^s$ represents an ambiguity of the inter-station single-difference ionosphere-free combination of the GPS satellite s, $\Delta T_G^s$ represents an inter-station single-difference troposphere delay of the GPS satellite, $\Delta \varepsilon_{IF,G}^s$ represents the measurement noise of the inter-station single-difference ionosphere-free combination of the GPS satellite, $\Delta P_{IF,G}^s$ represents a pseudorange observation of the inter-station single-difference ionosphere-free combination of the GPS satellite s, $\Delta d_{IF,G}$ represents a pseudorange hardware delay of the inter-station single-difference ionosphere-free combination of the GPS satellite receiver end, and $\Delta e_{IF,G}^s$ represents a pseudorange measured noise of the inter-station single-difference ionosphere-free combination of the GPS satellite s; $q=1_C, 2_C, \ldots, n_C$, $n_C$ represents a number of BDS satellites, $\Delta \phi_{IF,C}^q$ represents a carrier observation value of an inter-station single-difference ionosphere-free combination of BDS satellite q, $\Delta \rho_C^q$ represents an inter-station single-difference station satellite distance of BDS satellite q, $\lambda_{NL,C}$ represents a BDS narrow-lane wavelength, $\Delta \delta_{IF,C}$ represents a carrier hardware delay of an inter-station single-difference ionosphere-free combination of the BDS receiver, $\Delta N_{IF,C}^q$ represents the ambiguity of the inter-station single-difference ionosphere-free combination of BDS satellite q, $\Delta T_C^q$ represents an inter-station single-difference troposphere delay of BDS satellite q, $\Delta \varepsilon_{IF,C}^q$ represents a measurement noise of the inter-station single-difference ionosphere-free combination of BDS satellite q, $\Delta P_{IF,C}^q$ represents a pseudorange observation of the inter-station single-difference ionosphere-free combination of BDS satellite q, $\Delta d_{IF,C}$ represents a pseudorange hardware delay of the inter-station single-difference ionosphere-free combination of the BDS satellite receiver, and $\Delta e_{IF,C}^q$ represents a pseudorange measurement noise of the inter-station single-difference ionosphere-free combination of BDS satellite q; $\Delta \phi_{1,G}^s$ represents an inter-station single-difference carrier observation on L1 frequency of GPS satellite s, $\Delta \phi_{2,G}^s$ represents an inter-station single-difference carrier observation on L2 frequency of GPS satellite S, $\Delta N_{1,G}^s$ represents an inter-station single-difference ambiguity on L1 frequency of GPS satellite s, $\Delta N_{2,G}^s$ represents an inter-station single-difference ambiguity on L2 frequency of GPS satellite s, $\Delta P_{1,G}^s$ represents an inter-station single-difference pseudorange observation on L1 frequency of GPS satellites s, $\Delta P_{2,G}^s$ represents an inter-station single-difference pseudorange observation on L2 frequency of GPS satellites s, $f_{1,G}$ represents a GPS L1 frequency, and $f_{2,G}$ represents a GPS L2 frequency; and $\Delta \phi_{1,C}^q$ represents an inter-station single-difference carrier observation on B1 frequency of BDS satellite q, $\Delta \phi_{2,C}^q$ represents an inter-station single-difference carrier observation on B2 frequency of BDS satellite, $\Delta N_{1,C}^q$ represents the inter-station single-difference ambiguity on B1 frequency of the BDS satellite q, $\Delta N_{2,C}^q$ represents the inter-station single-difference ambiguity on B2 frequency of the BDS satellite q, $\Delta_{1,C}^q$ represents the inter-station single-difference pseudorange observation on B1 frequency of BDS satellite q, $\Delta P_{2,C}^q$ represents the inter-station single-difference pseudorange observation on B2 frequency of the BDS satellite q, $f_{1,C}$ represents a B1 frequency of BDS, and $f_{2,C}$ represents a B2 frequency of BDS;

step 12: selecting a GPS reference satellite by the processor to construct the GPS intra-system double-difference ionosphere-free combination model and the GPS/BDS inter-system double-difference ionosphere-free combination model according to the inter-station single-difference ionosphere-free combination model constructed in the step 11:

when a GPS satellite $1_G$ is used as a reference satellite, equations (8) and (9) representing GPS intra-system double-difference ionosphere-free combination models, and equations (10) and (11) representing GPS/BDS inter-system double-difference ionosphere-free combination models:

$$\nabla \Delta \phi_{IF,G}^{1G,s} = \nabla \Delta \rho_G^{1G,s} + \lambda_{NL,G} \Delta N_{IF,G}^{1G,s} + \Delta \nabla T_G^{1G,s} + \nabla \Delta \varepsilon_{IF,G}^{1G,s} \quad (8)$$

$$\nabla \Delta P_{IF,G}^{1G,s} = \nabla \Delta \rho_G^{1G,s} + \nabla \Delta T_G^{1G,s} + \nabla \Delta e_{IF,G}^{1G,s} \quad (9)$$

$$\nabla \Delta \phi_{IF,GC}^{1G,s} = \Delta \phi_{IF,C}^{q} - \Delta \phi_{IF,G}^{1G} \quad (10)$$
$$= \nabla \Delta \rho_{GC}^{1G,q} + \lambda_{NL,C} \nabla \Delta N_{IF,G}^{1G,q} + (\lambda_{NL,C} - \lambda_{NL,G}) \Delta N_{IF,G}^{1G} +$$
$$\lambda_{NL,C} \nabla \Delta \delta_{IF,GC} + \nabla \Delta T_{GC}^{1G,q} + \nabla \Delta \varepsilon_{IF,GC}^{1G,q}$$

$$\nabla \Delta P_{IF,GC}^{1G,q} = \quad (11)$$
$$\Delta P_{IF,C}^{q} - \Delta P_{IF,G}^{1G} = \nabla \Delta \rho_{GC}^{1G,q} + \nabla \Delta d_{IF,GC} + \nabla \Delta T_{GC}^{1G,q} + \nabla \Delta e_{IF,GC}^{1G,q}$$

wherein, $\nabla \Delta \phi_{IF,G}^{1G,s}$ represents a carrier observation of the GPS intra-system double-difference ionosphere-free combination, $\nabla \Delta \rho_G^{1G,s}$ represents a GPS intra-system double-difference distance between stations and satellites, $\Delta N_{IF,G}^{1G,s}$ represents a double-difference ambiguity of the GPS intra-system ionosphere-free combination, $\nabla \Delta T_G^{1G,s}$ represents a GPS intra-system double-difference troposphere delay, $\nabla \Delta \varepsilon_{IF,G}^{1G,s}$ represents a carrier observation of the GPS intra-system double-difference ionosphere-free combination, $\nabla \Delta P_{IF,G}^{1G,s}$ represents a pseudorange observation of the GPS intra-system double-difference ionosphere-free combination, and $\nabla \Delta_{IF,G}^{1G,s}$ represents a carrier measurement noise of the GPS intra-system double-difference ionosphere-free combination; and $\nabla \Delta_{IF,GC}^{1G,q}$ represents a carrier observation of the GPS/BDS inter-system double-difference ionosphere-free combination, $\nabla \Delta \rho_{GC}^{1G,q}$ represents a GPS/BDS inter-system double-difference distance between satellites and stations, $\nabla \Delta N_{IF,GC}^{1G,q}$ represents an ambiguity of the GPS/BDS inter-system double-difference ionosphere-free combination, $\Delta N_{IF,G}^{1G}$ represents an ambiguity of the inter-station single-difference ionosphere-free combination of the GPS reference satellite $$\nabla \Delta \delta_{IF,GC} = \Delta \delta_{IF,C} - \frac{\lambda_{NL,G}}{\lambda_{NL,C}} \Delta \delta_{IF,G}$$

represents a carrier difference inter-system bias of the GPS/BDS ionosphere-free combination, $\nabla \Delta_{GC}^{1G,q}$ represents a GPS/BDS inter-system double-difference troposphere delay, $\nabla \Delta \varepsilon_{IF,GC}^{1G,q}$ represents a carrier observation of the GPS/BDS inter-system double-difference ionosphere-free combination, $\nabla \Delta P_{IF,GC}^{1G,q}$ represents a pseudorange observation of the GPS/BDS inter-system double-difference ionosphere-free combination, $\nabla \Delta d_{IF,GC} = \Delta d_{IF,C} - \Delta d_{IF,G}$ represents a GPS/BDS pseudorange differential inter-system bias of the ionosphere-free combination, and $\nabla \Delta e_{IF,GC}^{1G,q}$ represents a pseudorange observation of the GPS/BDS inter-system double-difference ionosphere-free combination; and step 13: selecting a BDS reference satellite by the processor to construct intra-system double-difference wide-lane ambiguity calculation models of GPS and BDS:

when a BDS satellite $1_C$ is used as a BDS reference satellite, then the respective intra-system double-difference wide-lane ambiguity calculation models of the GPS and the BDS being:

$$\nabla \Delta N_{WL,G}^{1G,s} = \nabla \Delta \varphi_{WL,G}^{1G,s} - \frac{f_{1,G} \nabla \Delta P_{1,G}^{1G,s} + f_{2,G} \nabla \Delta P_{2,G}^{1G,s}}{\lambda_{WL,G}(f_{1,G} + f_{2,G})} \quad (12)$$

-continued $$\nabla \Delta N_{WL,C}^{1C,q} = \nabla \Delta \varphi_{WL,C}^{1C,q} - \frac{f_{1,C} \nabla \Delta P_{1,C}^{1C,q} + f_{2,C} \nabla \Delta P_{2,C}^{1C,q}}{\lambda_{WL,C}(f_{1,C} + f_{2,C})} \quad (13)$$

wherein, $\nabla \Delta_{WL,G}^{1G,s}$ represents a GPS double-difference wide-lane ambiguity, $\nabla \Delta \varphi_{WL,G}^{1G,s}$ represents a GPS double-difference wide-lane carrier observation, $\nabla \Delta P_{1,G}^{1G,s}$ $\nabla \Delta P$ represents a GPS L1 double-difference pseudorange observation, $\nabla \Delta P_{2,G}^{1G,s}$ represents a GPS L2 double-difference pseudorange observation, and $\lambda_{WL,G}$ represents a GPS wide-lane wavelength; and $\nabla \Delta N_{WL,C}^{1G,q}$ represents a BDS double-difference wide-lane ambiguity, $\nabla \Delta \varphi_{WL,C}^{1G,q}$ represents a BDS double-difference wide-lane carrier observation, $\nabla \Delta P_{1,C}^{1G,q}$ represents a BDS B double-difference pseudorange observation, $\nabla \Delta_{2,C}^{1G,q}$ represents a BDS B2 double-difference pseudorange observation, and $\lambda_{WL,C}$ represents a BDS wide-lane wavelength; and performing multi-epoch smooth rounding on equations (12) and (13) to obtain a double-difference wide-lane whole-cycle ambiguity:

$$\nabla \hat{\Delta} \bar{N}_{WL,G}^{1G,s} = \text{round}\left(\frac{1}{k}\sum_{i=1}^{k} \nabla \Delta N_{WL,G}^{1G,s}\right) \quad (14)$$

$$\nabla \hat{\Delta} \bar{N}_{WL,C}^{1C,q} = \text{round}\left(\frac{1}{k}\sum_{i=1}^{k} \nabla \Delta N_{WL,C}^{1C,q}\right)$$

$$k \in N^+$$

wherein, $\nabla \hat{\Delta} \bar{N}_{WL,G}^{1G,s}$ and $\nabla \hat{\Delta} \bar{N}_{WL,C}^{1G,s}$ are respectively the double-difference wide-lane whole-cycle ambiguities of the GPS and the BDS obtained by multi-epoch smooth rounding, round represents a rounding operator, and k represents an epoch number.

3. The tightly combined GPS/BDS carrier differential positioning method according to claim 2, wherein the step 2 specifically comprises:

step 21: reparameterizing the ambiguity of the GPS/BDS inter-system double-difference ionosphere-free combination by the processor according to the BDS reference satellite selected in the step 13:

according to the step 12, the ambiguity of the GPS/BDS inter-system double-difference ionosphere-free combination being represented as:

$$\nabla \Delta N_{IF,GC}^{1G,q} = (\Delta N_{IF,C}^{q} - \Delta N_{IF,C}^{1C}) + (\Delta N_{IF,C}^{1C} - \Delta N_{IF,G}^{1G}) = \nabla \Delta N_{IF,C}^{1C,q} + \nabla \Delta N_{IF,GC}^{1G1C} \quad (15)$$

wherein, $\Delta N_{IF,C}^{1c}$ represents an ambiguity of an inter-station single-difference ionosphere-free combination of a BDS reference satellite, $\nabla \Delta N_{IF,C}^{1C,q}$ represents an ambiguity of a BDS intra-system double-difference ionosphere-free combination, and $\nabla \Delta N_{IF,GC}^{1G1C}$ represents ambiguities of the GPS/BDS inter-system double-difference ionosphere-free combinations of the BDS reference satellite and the GPS reference satellite;

according to equation (15), equation (10) being represented as:

$$\nabla \Delta \phi_{IF,GC}^{1G,q} = \nabla \Delta \rho_{GC}^{1G,q} + \lambda_{NL,C} \nabla \Delta N_{IF,C}^{1C,q} + \lambda_{NL,C} \nabla \Delta N_{IF,GC}^{1G1C} + (\lambda_{IF,C} - \lambda_{IF,G}) \Delta N_{IF,G}^{1G} + \lambda_{NL,C} \nabla \Delta \delta_{IF,GC} + \nabla \Delta T_{GC}^{1G,q} + \nabla \Delta \varepsilon_{IF,GC}^{1G,q} \quad (16)$$

wherein, in equation (10), $\nabla \Delta N_{IF,GC}^{1G1c}$, $\Delta N_{IF,G}^{1G}$ and $\nabla \Delta \delta_{IF,GC}$ are parameters shared by all BDS satellites and are linearly correlated; and step 22: combining the shared parameters and reparametrizing the ionosphere-free combination carrier difference inter-system bias by the processor to realize parameter decorrelation:

according to equation (16), an observation equation of the GPS/BDS inter-system double-difference ionosphere-free combination after the shared parameters are combined being represented as:

$$\nabla\Delta\phi_{IFGC}^{1G,q} = \nabla\Delta\rho_{GC}^{1G,q} + \lambda_{NL,C}\nabla\Delta N_{NL,C}^{1C,q} + \lambda_{NL,C}\nabla\Delta\overline{\delta}_{IF,GC} + \nabla\Delta T_{GC}^{1G,q} + \nabla\Delta\varepsilon_{IF,GC}^{1G,q} \quad (17)$$

wherein, $\nabla\Delta\overline{\delta}_{IF,GC}$ represents an ionosphere-free combination carrier difference inter-system bias after reparameterization, and $$\nabla\Delta\overline{\delta}_{IF,GC} = \nabla\Delta N_{IF,GC}^{1G1C} + \nabla\Delta\delta_{IF,GC} + \left(1 - \frac{\lambda_{NL,C}}{\lambda_{NL,G}}\right)\Delta N_{IF,G}^{1G}.$$

4. The tightly combined GPS/BDS carrier differential positioning method according to claim 3, wherein the step 3 specifically comprises:

step 31: performing GPS reference conversion by the processor:

assuming that the GPS reference satellite is converted from $1_G$ into $i_G$ at a $t^{th}$ epoch, a corresponding ionosphere-free combination carrier difference inter-system bias $\nabla\Delta\overline{\delta}_{IF,GC}(t)$ of the $t^{th}$ epoch being:

$$\nabla\Delta\overline{\delta}_{IF,GC}(t) = \nabla\Delta\overline{\delta}_{IF,GC}(t-1) - \frac{\lambda_{NL,G}}{\lambda_{NL,C}}\Delta\nabla N_{IF,G}^{1G,iG} = \quad (18)$$

$$\nabla\Delta\delta_{IF,GC} + \nabla\Delta N_{IF,GC}^{iG,1C} + \left(1 - \frac{\lambda_{NL,G}}{\lambda_{NL,C}}\right)\Delta N_{IF,G}^{iG}$$

wherein, $\nabla\Delta\overline{\delta}_{IF,GC}(t-1)$ is an ionosphere-free combination carrier difference inter-system bias of a $(t-1)^{th}$ epoch; and step 32: performing BDS reference conversion by the processor:

assuming that the BDS reference satellite is converted from $1_C$ into $i_C$ at a $j^{th}$ epoch, while the GPS reference satellite at the moment being $1_G$ in the step 31, then a corresponding ionosphere-free combination carrier difference inter-system bias $\nabla\Delta\overline{\delta}_{IF,GC}(j)$ of the $j^{th}$ epoch being:

$$\nabla\Delta\overline{\delta}_{IF,GC}(j) = \nabla\Delta\overline{\delta}_{IF,GC}(j-1) + \nabla\Delta N_{IF,GC}^{1C,iC} = \quad (19)$$

$$\nabla\Delta\delta_{IF,GC} + \nabla\Delta N_{IF,GC}^{iG,iC} + \left(1 - \frac{\lambda_{NL,G}}{\lambda_{NL,C}}\right)\Delta N_{IF,G}^{iG}$$

wherein, $\nabla\Delta\overline{\delta}_{IF,GC}(j-1)$ is an ionosphere-free combination difference carrier inter-system bias of a $(j-1)^{th}$ epoch;

so far, the continuous estimability of the ionosphere-free combination carrier difference inter-system bias is realized.

5. The tightly combined GPS/BDS carrier differential positioning method according to claim 4, wherein the step 4 specifically comprises:

step 41: separating the ambiguity of the GPS L1 and the ambiguity of BDS B1 by the processor according to the wide-lane ambiguity obtained in the step 13 by combining the ionosphere-free combination with a wide-lane combination:

$$\nabla\Delta N_{1,G}^{1G,s} = \nabla\Delta N_{IF,G}^{1G,s} - \frac{f_{2,G}}{f_{1,G} - f_{2,G}}\nabla\Delta\overline{N}_{WL,G}^{1G,s} \quad (20)$$

$$\nabla\Delta N_{1,C}^{1C,q} = \nabla\Delta N_{IF,C}^{1C,q} - \frac{f_{2,C}}{f_{1,C} - f_{2,C}}\nabla\Delta\overline{N}_{WL,C}^{1C,q} \quad (21)$$

wherein, $\nabla\Delta N_{1,G}^{1G,s}$ is a separated ambiguity float solution of the GPS L1, $\nabla\Delta N_{1,C}^{1C,q}$ is a separated ambiguity float solution of the BDS B1, $\nabla\Delta\overline{N}_{1,G}^{1G,s}$ is an integer-ambiguity solution of the GPS L1, and $\nabla\Delta\overline{N}_{1,C}^{1C,q}$ is an integer-ambiguity solution of the BDS B1; and step 42: according to the wide-lane ambiguity obtained in the step 13 and the ambiguity of the GPS L1 and the ambiguity of the BDS B1 obtained in the step 41, calculating an integer-ambiguity solution of the GPS L2 and an integer-ambiguity solution of the BDS L2 by the processor:

$$\nabla\Delta\overline{N}_{2,G}^{1G,s} = \nabla\Delta\overline{N}_{1,G}^{1G,s} - \nabla\Delta\overline{N}_{WL,G}^{1G,s}, \nabla\Delta\overline{N}_{2,C}^{1C,q} = \nabla\Delta\overline{N}_{1,C}^{1C,q} - \nabla\Delta\overline{N}_{WL,C}^{1C,q} \quad (22)$$

wherein, $\nabla\Delta\overline{N}_{2,G}^{1G,s}$ and $\nabla\Delta\overline{N}_{2,C}^{1C,q}$ are respectively the integer-ambiguity solutions of the GPS L2 and the BDS B2.

6. The tightly combined GPS/BDS carrier differential positioning method according to claim 5, wherein the integer-ambiguity solutions $\nabla\Delta\overline{N}_{1,G}^{1G,s}$ and $\nabla\Delta\overline{N}_{1,C}^{1C,q}$ of the GPS L1 and the BDS B1 are searched by a least-squares ambiguity decorrelation adjustment (LAMBDA) method.

7. The tightly combined GPS/BDS carrier differential positioning method according to claim 5, wherein the step 5 specifically comprises: forming the double-difference ionosphere-free combination by the processor according to the step 21 based on the integer-ambiguity solutions and the carrier observations obtained in the step 41 and the step 42, and substituting the formed ionosphere-free combination and the ionosphere-free combination carrier difference inter-system bias obtained in the step 2 into the equations (5) and (7) for positioning.

\* \* \* \* \*